(12) United States Patent
Tokumaru et al.

(10) Patent No.: US 9,606,373 B2
(45) Date of Patent: Mar. 28, 2017

(54) POLARIZED MIRRORED GLASSES LENS (71) Applicants: MITSUBISHI GAS CHEMICAL COMPANY, INC., Tokyo (JP); MGC FILSHEET CO., LTD., Saitama (JP)

(72) Inventors: Terutaka Tokumaru, Tokyo (JP); Kazuhisa Mitsuhata, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 20 days.

(21) Appl. No.: 14/346,829

(22) PCT Filed: Oct. 1, 2012

(86) PCT No.: PCT/JP2012/075304
§ 371 (c)(1),
(2) Date: Mar. 24, 2014

(87) PCT Pub. No.: WO2013/051489
PCT Pub. Date: Apr. 11, 2013

(65) Prior Publication Data
US 2014/0232983 A1    Aug. 21, 2014

(30) Foreign Application Priority Data

Oct. 3, 2011    (JP) .................................. 2011-218924

(51) Int. Cl.
*G02C 7/02* (2006.01)
*G02C 7/12* (2006.01)
(Continued)

(52) U.S. Cl.
CPC ............. *G02C 7/02* (2013.01); *G02B 5/3033* (2013.01); *G02C 7/10* (2013.01); *G02C 7/12* (2013.01)

(58) Field of Classification Search
CPC ... G02C 7/02; G02C 7/10; G02C 7/12; G02B 5/3033; G02B 5/30; G02B 5/3083;
(Continued)

(56) References Cited

U.S. PATENT DOCUMENTS 5,051,309 A    9/1991    Kawaki et al.
5,702,813 A    12/1997    Murata et al.
(Continued)

FOREIGN PATENT DOCUMENTS

CN    101874222    10/2010
EP    1162482    11/2004
(Continued)

OTHER PUBLICATIONS

Search report from E.P.O . in EP 12838158.9, mail date is Apr. 24, 2015.
(Continued)

*Primary Examiner* — Pascal M Bui-Pho
*Assistant Examiner* — Alberto Betancourt
(74) *Attorney, Agent, or Firm* — Greenblum & Bernstein, P.L.C.

(57) ABSTRACT

Provided is a spherical or aspherical polarized mirrored glasses lens that substantially prevents the appearance of reflections caused by reflection from the mirrored surface, has a high transmittance, and with the use of a colored absorption-polarization film layer, allows arbitrary selection of the color of the field of view of the sunglasses user and the color of the lens as seen by others. A polarized mirrored glasses lens is fabricated, said lens being characterized by having, in order from the light-incidence side, at least a reflection-polarization film layer and an absorption-polarization film layer, and further characterized in that: the transmission axes of said layers are aligned; and the light-incidence side is a convex spherical or aspherical surface.

4 Claims, 2 Drawing Sheets

(51) Int. Cl.
*G02B 5/30* (2006.01)
*G02C 7/10* (2006.01)

(58) Field of Classification Search
CPC .......... G02B 5/3058; G02B 6/2773; G02F 2001/133545; G02F 1/133533; G02F 2001/133531; Y10T 428/1041
USPC .......... 351/159.56, 159.63, 159.71, 159.66, 351/159.01, 159.41, 159.47, 159.49, 351/159.53, 159.57, 159.6, 159.61, 351/159.62, 159.65, 159.73, 159.74, 351/159.75; 359/487.01–487.06
See application file for complete search history.

(56) References Cited

U.S. PATENT DOCUMENTS

| | | | |
|---|---|---|---|
| 6,096,375 A * | 8/2000 | Ouderkirk | B29C 55/023 359/487.02 |
| 6,315,411 B1 | 11/2001 | Hatchiguian | |
| 7,289,257 B1 * | 10/2007 | Nakagoshi | B29C 45/14811 351/159.61 |
| 2005/0122587 A1 | 6/2005 | Ouderkirk et al. | |
| 2007/0052922 A1 | 3/2007 | King et al. | |
| 2009/0122261 A1 * | 5/2009 | Chou | B29D 11/00634 351/159.62 |
| 2013/0010253 A1 | 1/2013 | Tokumaru et al. | |
| 2013/0070196 A1 | 3/2013 | Tokumaru et al. | |

FOREIGN PATENT DOCUMENTS

| | | |
|---|---|---|
| GB | 2238882 | 6/1991 |
| JP | 61-233701 | 10/1986 |
| JP | 02-132417 | 5/1990 |
| JP | 08-52817 | 2/1996 |
| JP | 2000-66149 | 3/2000 |
| JP | 3621415 B2 | 11/2004 |
| JP | 2006-11281 | 1/2006 |
| JP | 2011-180266 | 9/2011 |
| WO | 91/07674 | 5/1991 |
| WO | 35/17691 A1 | 6/1995 |
| WO | 2009/054835 | 4/2009 |
| WO | 2011/105055 A1 | 1/2011 |

OTHER PUBLICATIONS

U.S. Appl. No. 14/348,753 to Terutaka Tokumaru et al., filed Mar. 31, 2014.
International Search Report issued Jan. 15, 2013 in PCT/JP2012/075304.

* cited by examiner

POLARIZED MIRRORED GLASSES LENS

TECHNICAL FIELD

The present invention relates to a spherical or aspherical polarized mirrored glasses lens that substantially prevents the appearance of reflections caused by reflection from the mirrored surface, has a high transmittance, and with the use of a colored absorption-polarization film layer, allows arbitrary selection of the appearance color of the lens and the color of the field of view of the sunglasses user.

BACKGROUND ART

Polarizing lenses are widely used for sunglasses or goggles because of excellent anti-glare properties. As polarizing films to be used for polarizing lenses, those obtained by staining a polymer film made of polyvinyl alcohol or a derivative thereof with a dichroism pigment such as iodine and an azo dye and subjecting it to orientation by means of uniaxial stretching are used.

A transparent protection sheet is bonded to both the surfaces of such a polarizing film to produce a polarizing sheet, and then it is subjected to a curving process to provide a curved polarizing lens. In the case of polarizing lenses particularly requiring impact resistance and heat resistance, a polycarbonate-based resin sheet is used as a protection sheet (Patent Document 1).

Further, for the purpose of further improving impact resistance or providing a lens for vision correction, injected polarized lenses obtained by lining the polarizing sheet with a polycarbonate-based resin by means of injection molding after the curving process are also widely used (Patent Document 2).

Further, imparting design property to lenses is generally carried out, and sunglasses in which gradation is applied to lenses and sunglasses in which surfaces of lenses are mirrored are commercially available.

In the case of mirror coating, there is a problem that light incident on the face from the outside of the lens or through the lens is reflected from the face and further reflected from the mirror coating to easily cause the appearance of reflections.

For the purpose of reducing the appearance of reflections, methods in which a dielectric membrane having a high light absorption coefficient is laminated on the back surface side of a reflection layer (Patent Document 3) or a base material of lenses is colored (Patent Document 4) are disclosed.

However, since a high light absorption rate in the dielectric membrane or light absorption layer is required in order to suppress the appearance of reflections, there is a problem that light transmitted through the lens is reduced. Moreover, when the transmittance of the lens is increased, there is a problem that the appearance of reflections cannot be completely suppressed.

Further, by adjusting the refraction index and film thickness of each layer of a dielectric multi-layer film, a mirror coating, in which the reflection rate at a specific wavelength is increased to provide a reflected color having a high color purity, and which provides a variety of colors, has been obtained (Patent Document 4).

However, when the color purity of the reflected color is increased, the wavelength component of the transmitted light is decreased, and therefore there is a problem of reduction in visibility. For correcting the wavelength component, a method for coloring a base material for lenses is disclosed (Patent Document 4). However, in methods for correcting a wavelength component by means of absorption such as coloring a base material for lenses, there is a problem that the transmittance of lenses is reduced by strong color correction. Moreover, when the transmittance of lenses is increased, there is a problem that sufficient color correction cannot be obtained.

PRIOR ART DOCUMENTS

Patent Documents

Patent Document 1: U.S. Pat. No. 5,051,309
Patent Document 2: Japanese Laid-Open Patent Publication No. H08-52817
Patent Document 3: Japanese Laid-Open Patent Publication No. S61-233701
Patent Document 4: Japanese Laid-Open Patent Publication No. 2000-66149

SUMMARY OF THE INVENTION

Problems to be Solved by the Invention

When the appearance of reflections from the mirrored surface is tried to be completely reduced, the light absorption rate in the light absorption layer must be increased. In this case, there is a problem that transmitted light from the convex surface side to the concave surface side of the lens is extremely reduced, resulting in undesirable dimness of vision.

Further, when the reflection of a certain wavelength component is increased with the emphasis on fashionability, since the wavelength component is decreased in the transmitted light, there is a problem that visibility is reduced or undesirable dimness of vision is caused.

Means for Solving the Problems

The present inventors found that a polarized mirrored glasses lens, which substantially prevents the appearance of reflections caused by reflection from the mirrored surface and has a high transmittance, can be obtained by using polarization properties of a reflection-polarization film layer and an absorption-polarization film layer, and achieved the present invention. The present inventors further found that use of a colored absorption-polarization film layer allows arbitrary selection of the appearance color of the polarized mirrored glasses lens and the color of the field of view of the sunglasses user, and achieved the present invention.

The present invention relates to a polarized mirrored glasses lens, which has, in order from the light incidence side, at least a reflection-polarization film layer and an absorption-polarization film layer, wherein the transmission axes of said layers are aligned, and wherein the light incidence side is a convex spherical or aspherical surface.

The present invention also relates to a polarized mirrored glasses lens, wherein a colored absorption-polarization film layer is arranged on the light incidence side of the reflection-polarization film layer with the transmission axes of said layers being aligned.

The present invention further relates to a polarized mirrored glasses lens, wherein a transparent thermoplastic resin film or sheet layer is laminated, via an adhesive layer, on the light emission side of the absorption-polarization film layer and/or the light incidence side of the reflection-polarization film layer.

The present invention further relates to a polarized mirrored glasses lens, wherein a transparent thermoplastic resin film or sheet layer is laminated, via an adhesive layer, on the light emission side of the absorption-polarization film layer and/or the light incidence side of the colored absorption-polarization film layer.

The present invention further relates to an injected polarized mirrored glasses lens, wherein the transparent thermoplastic resin film or sheet layer is arranged on the light emission side of the absorption-polarization film layer, and wherein a layer made by injection-molding transparent thermoplastic resin is integrated into the surface thereof.

Advantageous Effect of the Invention

According to the present invention, it is possible to provide a polarized mirrored glasses lens, which substantially prevents the appearance of reflections caused by reflection from the mirrored surface and has a high transmittance. In addition, it is possible to provide a colored polarized mirrored glasses lens, in which the appearance color of the lens and the color of the field of view of the sunglasses user can be arbitrarily selected.

EMBODIMENTS FOR CARRYING OUT THE INVENTION

Firstly, the function and the like of each film or sheet in the present invention will be described below.

The reflection-polarization film layer of the present invention has the function to transmit a predetermined linear polarized light component of an incident light and to reflect a linear polarized light component perpendicular thereto. Further, this film layer has the same function with respect to an incident light from the opposite surface side. The reflection-polarization film layer is not particularly limited as long as it transmits a predetermined linear polarized light component of an incident light and reflects a linear polarized light component perpendicular thereto. Examples thereof include a birefringent multilayer laminated film, and for example, a reflection-polarization film manufactured by 3M (DBEF) is commercially available.

It is widely known that the aforementioned DBEF is used for the purpose of improving the luminance of liquid crystal displays in the field of liquid crystal displays.

This DBEF is a polarization film which transmits a light in the vibration direction of the electric field parallel to one in-plane axis (transmission axis) (hereinafter arbitrarily abbreviated as "light parallel to the transmission axis") and reflects a light in the vibration direction of the electric field perpendicular thereto (hereinafter arbitrarily abbreviated as "light perpendicular to the transmission axis").

Specifically, the polarization effect is exerted by allowing only the light parallel to the transmission axis, among lights incident on the DBEF, to be transmitted. Lights, which are not transmitted through the DBEF, are not absorbed by the DBEF substantially and are reflected thereby. Accordingly, the lights reflected by the DBEF are returned to a backlight and diffusely reflected by a reflection element such as a PET resin foam usually incorporated into the backlight, and returned to the DBEF again.

Then, among the lights returned to the DBEF, the light parallel to the transmission axis is transmitted, and lights perpendicular thereto are reflected again. Thus, when using the DBEF, the strength of transmitted polarized lights is increased by the repeat of the transmission-reflection action to effectively increase the light emission luminance of the liquid crystal display surface.

Regarding applications of the DBEF, there is almost no example of use thereof other than the use for the purpose of improving the luminance of the liquid crystal display, and in particular, there has been no example of use for sunglasses.

The absorption-polarization film layer of the present invention has the function to almost fully transmit a predetermined linear polarized light component of an incident light and to absorb a linear polarized light component perpendicular thereto. Typical examples of this absorption-polarization film layer include a PVA polarizing film, and it is produced by allowing iodine or a dichroism pigment to be adsorbed to a polymer film made of polyvinyl alcohol or a derivative thereof and subjecting the film to uniaxial stretch orientation. As a dye, from the viewpoint of heat resistance, a direct dye consisting of an azo dye having a sulfonic acid group is preferred.

The higher the transmittance of the absorption-polarization film layer is, the lighter a lens obtained is, and the higher the polarization degree is, the more the appearance of reflections on the mirror back surface is reduced. This is because the higher the polarization degree is, the higher the light absorption rate of the absorption axis is and the appearance of reflections is caused after light is transmitted through the layer having a high light absorption rate twice.

The colored absorption-polarization film layer of the present invention has the function to almost fully transmit a predetermined linear polarized light component of an incident light, to absorb a specific wavelength region of a linear polarized light component perpendicular thereto, and to transmit the remaining wavelength region thereof.

This colored absorption-polarization film layer can be obtained in a manner similar to that for the aforementioned absorption-polarization film layer, suitably selecting a dye having an absorption spectrum providing a desired color tone. Preferred examples of materials for forming the colored absorption-polarization film layer include a PVA polarizing film.

For the purpose of decreasing the influence on the color of the field of view of the sunglasses user as much as possible, a film having a higher dichroic ratio is preferably used. Further, for the purpose of improving the color development of mirror color, a film having a high transmittance in a desired wavelength range and a low transmittance in the remaining wavelength range is preferably used.

The transparent thermoplastic resin film or sheet layer of the present invention is used as the reflection-polarization film layer, the absorption-polarization film layer or the protection layer of the colored absorption-polarization film layer, and a product in which the polarization function of each polarization film layer is not impaired by the curving process or injection molding is preferred.

As a material for forming the transparent thermoplastic resin film or sheet layer, for example, a resin such as polycarbonate, polyamide and triacetylcellulose (TAC) can be used. In the case of sunglasses or goggles requiring impact resistance and heat resistance, it is preferred to use aromatic polycarbonate derived from bisphenol A for the transparent thermoplastic resin film or sheet layer.

Further, when the optimum processing temperature of each of the aforementioned polarization film layers is low, for example, an aromatic polycarbonate/PCC composition (wholly alicyclic polyester composition), polyamide having a glass transition temperature of 130° C. or lower or the like is preferably selected.

The adhesive layer of the present invention is a layer for bonding each film or sheet constituting the polarized mirrored glasses lens.

As the adhesive layer, both a hot-melt adhesive and a curable adhesive can be used. Examples of the curable adhesive include an acrylic resin-based material, a urethane resin-based material, a polyester resin-based material, a melamine resin-based material, an epoxy resin-based material and a silicone-based material. For example, in the case of using a polycarbonate film or sheet for the transparent thermoplastic resin film or sheet layer, from the viewpoint of the adhesive layer itself or transparency and adhesion properties with respect to polycarbonate at the time of adhering, a two-component thermosetting urethane resin consisting of polyurethane prepolymer that is a urethane resin-based material and a curing agent is preferred.

As the transparent thermoplastic resin to be used for injection molding in the present invention, any resin to be used for injection-molded lenses can be used without particular limitation.

In particular, transparent polyamide and aromatic polycarbonate are used for injection-molded lenses and preferred. In addition, an aromatic polycarbonate/PCC composition (wholly alicyclic polyester composition), polyamide having a glass transition temperature of 130° C. or lower, etc. are also preferred.

Next, the arrangement of each film or sheet of the present invention will be described below.

The present invention is a polarized mirrored glasses lens, which has, in order from the light incidence side, at least a reflection-polarization film layer and an absorption-polarization film layer, wherein the transmission axes of said layers are aligned, and wherein the light incidence side is a convex spherical or aspherical surface.

The present inventors found that, by providing the above-described arrangement, the appearance of reflections caused by reflection from the mirrored surface is substantially prevented.

Before the present invention was achieved, the present inventors prepared a polarized mirrored glasses lens having a reflection-polarization film layer. In the case of this polarized mirrored glasses lens, by using the reflection-polarization film layer, the mirrored appearance was generated, resulting in the improvement of design property, but the appearance of strong reflections was also caused to significantly reduce visibility.

Then, in order to prevent the appearance of strong reflections, a polarized mirrored glasses lens in which a light absorption layer that does not have polarization dependency was added to the concave surface side of the reflection-polarization film layer was prepared. In the case of this polarized mirrored glasses lens, by adding the light absorption layer, the appearance of reflections was significantly reduced, but the light transmittance was also significantly reduced. As a result, there was no significant difference of performance between this polarized mirrored glasses lens and the conventional polarized sunglasses with mirror coating.

The present inventors diligently made researches on combinations of various functional films in order to obtain a polarized mirrored glasses lens which has high design property because of mirrored appearance, substantially no appearance of reflection and a high light transmittance, and finally solved the problem by arranging the absorption-polarization film layer on the concave surface side of the lens of the reflection-polarization film layer.

In the constitution of the polarized mirrored glasses lens of the present invention, the reflection-polarization film layer and the absorption-polarization film layer are arranged with the transmission axes thereof being aligned. It is inferred that the appearance of reflections is substantially prevented by employing the above-described constitution for the reason described below.

A predetermined linear polarized light component of an incident light from the concave surface side of the lens is absorbed by the absorption-polarization film layer and then reflected by the reflection-polarization film layer, and therefore, substantially no reflected light is generated. Further, a linear polarized light component perpendicular thereto is transmitted through both the absorption-polarization film layer and the reflection-polarization film layer, and therefore, since it is emitted from the convex surface side of the lens, no reflected light is generated.

Further, it is inferred that a high transmittance is obtained by employing the above-described constitution for the reason described below.

A predetermined linear polarized light component of an incident light from the convex surface side of the lens is reflected by the reflection-polarization film layer to generate good mirrored appearance. Further, a linear polarized light component perpendicular thereto is transmitted through both the reflection-polarization film layer and the absorption-polarization film layer, and therefore, the loss of light can be minimized.

The present inventors further diligently made researches and found that the absorption of the absorption-polarization film layer with respect to a predetermined linear polarized light component does not have to be as strong as that of usual polarized sunglasses, and that sufficient effects are obtained by weak absorption. Specifically, the present inventors found that sufficient effects are obtained by an optical concentration with respect to a predetermined linear polarized light component which is about half of that of usual polarized sunglasses.

A preferred embodiment of the present invention is a polarized mirrored glasses lens, wherein a colored absorption-polarization film layer is arranged on the light incidence side of the reflection-polarization film layer with the transmission axes of said layers being aligned.

By employing the above-described arrangement, the present inventors found a method for imparting a desired reflected color to the mirrored appearance of the polarized mirrored glasses lens without influence on the color of the field of view of the sunglasses user.

Before the present invention was achieved, the present inventors prepared a polarized mirrored glasses lens having a colored film that does not have polarization dependency on the convex surface side of the lens of the reflection-polarization film layer. In the case of this polarized mirrored glasses lens, by using the colored film and the reflection-polarization film layer, the mirrored appearance in which a desired colored reflected color was generated was provided, resulting in the improvement of design property, but the field of view of the sunglasses user was also colored to significantly change the color balance at the time of wearing the sunglasses, resulting in difficulty in seeing.

Then, in order to prevent the influence on the color of the field of view of the sunglasses user, a polarized mirrored glasses lens in which a layer for correcting the color of light transmitted through the colored film was added to the concave surface side of the reflection-polarization film layer was prepared. In the case of this polarized mirrored glasses lens, by adding the color correction layer, the influence on the color of the field of view of the sunglasses user was reduced, but the light transmittance was significantly reduced. As a result, there was no significant difference of performance between this polarized mirrored glasses lens and the conventional polarized sunglasses with colored mirror coating.

The present inventors diligently made researches on combinations of various functional films in order to obtain a polarized mirrored glasses lens in which a desired reflected color is imparted to the mirrored appearance of the polarized mirrored glasses lens without influence on the color of the field of view of the sunglasses user, and finally solved the problem by arranging the colored absorption-polarization film layer on the convex surface side of the lens of the reflection-polarization film layer.

Specifically, in the polarized mirrored glasses lens according to the preferred embodiment of the present invention, the absorption-polarization film layer is arranged on the concave surface side of the reflection-polarization film layer and the colored absorption-polarization film layer is arranged on the convex surface side of the reflection-polarization film layer, and the directions of the transmission axes of the polarization film layers are aligned.

It is inferred that a desired colored reflected color is generated in the mirrored appearance by employing the above-described constitution for the reason described below.

With respect to a predetermined linear polarized light component of an incident light from the convex surface side of the lens, a specific wavelength range is absorbed by the colored absorption-polarization film layer and the remaining wavelength range is transmitted. This transmitted light is reflected by the reflection-polarization film layer to the convex surface side of the lens to generate a mirrored appearance having a reflected color.

Further, it is inferred that the influence on the color of the field of view of the sunglasses user is prevented by employing the above-described constitution for the reason described below.

A linear polarized light component perpendicular to the predetermined linear polarized light component of the incident light from the convex surface side of the lens is transmitted through all of the colored absorption-polarization film layer, the reflection-polarization film layer and the absorption-polarization film layer, and therefore, the loss of light can be minimized.

Moreover, by using a film layer having a high polarization degree as the colored absorption-polarization film layer, the light transmitted through the colored absorption-polarization film layer is not colored substantially. Therefore, the color of the field of view of the sunglasses user depends on the color of the absorption-polarization film layer, and accordingly, by suitably selecting an absorption-polarization film layer having a desired color, the color of the field of view of the sunglasses user can be arbitrarily selected.

The present inventors further diligently made researches and found that, regarding the absorption of the colored absorption-polarization film layer with respect to a predetermined linear polarized light component, sufficient effects are obtained by weak absorption. Specifically, the present inventors found that sufficient effects are obtained by an optical concentration with respect to a predetermined linear polarized light component which is about half.

Note that in the explanation of the working examples of the present invention, an uncolored reflection-polarization film layer was used. However, for imparting a color to the outer appearance of the lens, when a reflection-polarization film layer which itself has a desired reflected color is available, it is a preferred embodiment as an alternative for the combination of the colored absorption-polarization film layer and the reflection-polarization film layer.

Moreover, it is also possible to impart a desired color to the field of view of the sunglasses user by arranging the colored absorption-polarization film layer on the concave surface side of the lens of the absorption-polarization film layer.

Next, the preparation of the polarized mirrored glasses lens and injected polarized mirrored glasses lens of the present invention will be explained.

Firstly, a polarized mirrored sheet to be used for the polarized mirrored glasses lens of the present invention is prepared.

The polarized mirrored sheet is prepared by bonding each of films or sheets constituting the polarized mirrored glasses lens via an adhesive layer.

When bonding adjacent films or sheets, it is preferred to form an adhesive layer having a uniform thickness on the side of a film or sheet having high solvent resistance. After that, polarization film layers are bonded together with the transmission axes thereof being aligned, and then the adhesive layer is cured.

The obtained polarized mirrored sheet is punched into a desired lens shape, and it is subjected to a curving process.

The present invention can be curved to provide a spherical surface, elliptical surface or cylindrical surface. The curvature of the curved shape may be in a practical range without particular limitation, but by performing the curving process, even when the curvature of the curved shape is small, the mirrored appearance is more effectively generated, and therefore it is preferable.

Regarding conditions for the curving process, it is required to select retention of the polarization function of the reflection-polarization film layer, the absorption-polarization film layer or the colored absorption-polarization film layer as an essential condition.

Next, the aforementioned product subjected to the curving process is fitted into a mold and subjected to injection molding, thereby producing an injected polarized mirrored glasses lens having an improved resolution.

A transparent thermoplastic resin film or sheet layer at the surface on which a resin is injected and the resin to be injected are preferably of the same type, and in particular, polyamide and polycarbonate are used for injection-molded lenses and therefore are preferred.

Note that from the viewpoint of adhesion to the resin to be used for injection molding, on the surface of the transparent thermoplastic resin film or sheet layer at the surface on which the resin is injected, a primer layer for improving adhesion to the transparent resin to be used for injection molding may be suitably formed.

Moreover, on the surface of the transparent thermoplastic resin film or sheet layer at the surface on which the resin is injected, a transparent thermoplastic resin film or sheet layer that is the same type of the injected resin may be additionally bonded via an adhesive layer.

In addition to the above-described manner, the below-described matter can also be employed to prepare the polarized mirrored glasses lens of the present invention.

A curved polarized mirrored lens may be bonded to a molded plano lens or semifinished lens via an adhesive layer. Examples of materials of the lens include a polycarbonate-based resin, a urethane-based resin, a thiourethane-based resin, a polyamide-based resin and CR39. Further, as an adhesive to be used for bonding, an acrylic resin-based material, a urethane resin-based material or the like can be used.

Note that functions such as hard coating treatment, antireflection coating treatment and antifogging treatment may be suitably added to the surface of the polarized mirrored glasses lens or injected polarized mirrored glasses lens.

EXAMPLES

Hereinafter, the present invention will be specifically described by way of illustrative examples, but the present invention is not limited thereto. The evaluation of the lenses obtained in the working examples were conducted as described below.

<Visible Light Transmittance>

In order to evaluate the lightness of the field of view of the sunglasses user, the visible light transmittance of the lenses was measured using an ultraviolet-visible spectrophotometer UV2450 (Shimadzu Corporation).

<Evaluation of Ghost Image of Outer Appearance of Lenses>

The outer appearance of the lenses was evaluated from the convex surface side of the lenses macroscopically.
When having a ghost image: ○
When not having a ghost image: x
<Evaluation of Appearance of Reflection on the Concave Surface Side of Lenses>

The appearance of reflections on the concave surface side of the lenses caused by reflection by the reflection-polarization film layer (mirrored surface) was evaluated macroscopically.
When the appearance of reflections was not caused: ○
When the appearance of reflections was caused: x Example 1

Figure 1:
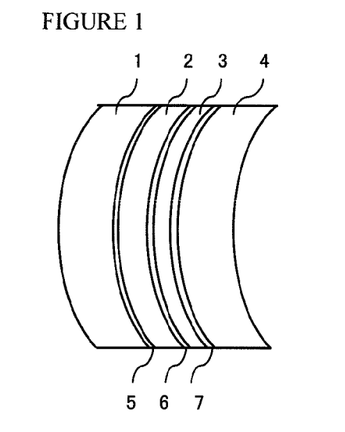
FIG. 1 is a schematic view of the section of the layer constitution of the polarized mirrored glasses lens in Example 1.

DBEF (manufactured by 3M) (transmittance: 48%, polarization degree: 88%) was used as a reflection-polarization film. An absorption-polarization film made of polyvinyl alcohol to which a dichroism pigment was adsorbed (transmittance: 38%, polarization degree: 94%) was arranged on the concave surface side of the lens of DBEF with the transmission axes of DBEF and the absorption-polarization film being aligned. In addition, a transparent thermoplastic resin film consisting of a polycarbonate sheet having a thickness of 0.3 mm (manufactured by Mitsubishi Gas Chemical Company, Inc.) was arranged on the convex surface side of the lens of DBEF and the concave surface side of the lens of the absorption-polarization film, and the films or sheets were bonded together by a urethane resin-based adhesive, thereby obtaining a polarized mirrored sheet.

The polarized mirrored sheet was punched into a strip shape by a die, whose basic shape is a true circle having a diameter of 79.5 mm, and by which the width in the vertical direction is cut to 55 mm, and the curving process was carried out using a mold having a base curve of 7.95 (curvature radius 66.67 mm), thereby preparing a curved polarized mirrored lens in FIG. 1. In the curving process, forming was carried out under the following conditions: mold temperature: 138° C., and retention time: 120 seconds. The base curve as used herein refers to a curvature of the front surface of the lens, and it is a value obtained by dividing 530 by the curvature radius (unit of millimeter). In addition, the antireflection coating treatment was applied to the concave surface side of the curved polarized mirrored lens. The results of evaluation of the obtained curved polarized mirrored lens are shown in Table 1.

The visible light transmittance was high (35%), and when the outer appearance of the lens was observed from the convex surface side of the lens, ghost image equivalent to that of the mirrored membrane generated by metal deposition was obtained. Further, when the appearance of reflections on the concave surface side of the lens caused by reflection by DBEF was confirmed macroscopically, the appearance of reflections was not caused.

Example 2

Figure 2:
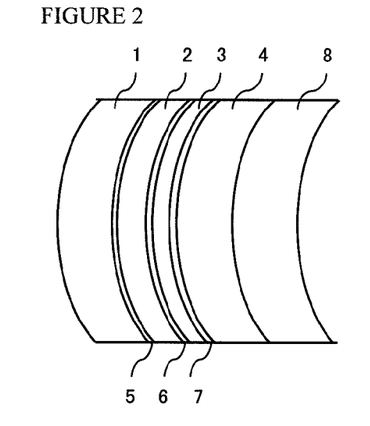
FIG. 2 is a schematic view of the section of the layer constitution of the injected polarized mirrored glasses lens in Example 2.

A curved polarized mirrored lens prepared in a manner similar to that in Example 1 was inserted into a mold for injection molding, and a melted polycarbonate was injection-molded on the concave surface side of the lens to form an injected resin layer, thereby obtaining an injected polarized mirrored lens in FIG. 2. At the time of injection molding, a mold having a base curve of 7.932 (curvature radius 66.81 mm), by which 2 polarizing lenses can be simultaneously formed at one injection, was used, and forming was carried out under the following conditions: measurement value: 40 mm, cylinder temperature: 300° C., mold temperature: 120° C., injection velocity: 25 mm/sec, pressure keeping: 60 MPa, and V-P switching position: 8 mm. In addition, the antireflection coating treatment was applied to the concave surface side of the injected polarized mirrored lens. The results of evaluation of the obtained injected polarized mirrored lens are shown in Table 1.

The visible light transmittance was high (35%), and when the outer appearance of the lens was observed from the convex surface side of the lens, ghost image equivalent to that of the mirrored membrane generated by metal deposition was obtained as in the case of Example 1. Further, when the appearance of reflections on the concave surface side of the lens caused by reflection by DBEF was confirmed macroscopically, the appearance of reflections was not caused.

Example 3

In the layer constitution of the polarized mirrored sheet prepared in Example 1, a colored absorption-polarization film made of polyvinyl alcohol to which a dichroism pigment was adsorbed was arranged on the convex surface side of the lens of DBEF with the transmission axes of the colored absorption-polarization film and DBEF being aligned. The films or sheets were bonded together by a urethane resin-based adhesive, thereby obtaining a colored polarized mirrored sheet. This colored polarized mirrored sheet was subjected to the curving process under the same conditions as those in Example 1 to prepare a curved colored polarized mirrored lens in FIG. 3. In addition, the antireflection coating treatment was applied to the concave surface side of the curved colored polarized mirrored lens. The results of evaluation of the obtained curved colored polarized mirrored lens are shown in Table 1.

Figure 3:
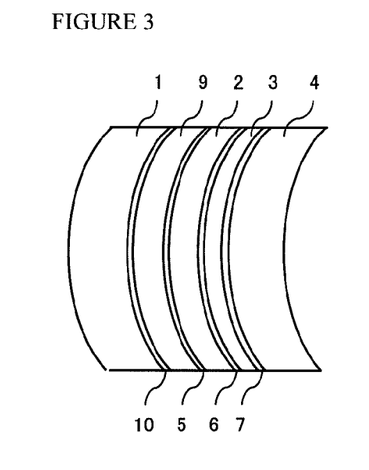
FIG. 3 is a schematic view of the section of the layer constitution of the polarized mirrored glasses lens in which the outer appearance of the lens is colored in Example 3.

The visible light transmittance was high (33%), and the loss of light due to coloring was minimized successfully. Further, when the outer appearance of the lens was observed from the convex surface side of the lens, a lens having both a reflected color and ghost image was obtained successfully. Further, when the appearance of reflections on the concave surface side of the lens caused by reflection by DBEF was confirmed macroscopically, the appearance of reflections was not caused.

Example 4

Figure 4:
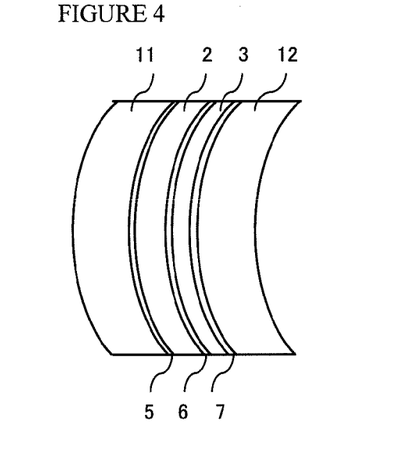
FIG. 4 is a schematic view of the section of the layer constitution of the polarized mirrored glasses lens in Example 4.

In the layer constitution of the polarized mirrored sheet prepared in Example 1, each of the polycarbonate sheet at the convex surface side of the lens and the polycarbonate sheet at the concave surface side of the lens was replaced by a transparent thermoplastic resin film consisting of a triacetylcellulose film (TAC) having a thickness of 80 μm (manufactured by Fujifilm Corporation), and a curved polarized mirrored lens in FIG. 4 was prepared in a manner similar to that in Example 1, except that the mold temperature and retention time at the time of the curving process were changed. In addition, the antireflection coating treatment was applied to the concave surface side of the curved polarized mirrored lens. The results of evaluation of the obtained curved polarized mirrored lens are shown in Table 1.

The visible light transmittance was high (35%), and when the outer appearance of the lens was observed from the convex surface side of the lens, ghost image equivalent to that of the mirrored membrane generated by metal deposition was obtained as in the case of Example 1. Further, when the appearance of reflections on the concave surface side of the lens caused by reflection by DBEF was confirmed macroscopically, the appearance of reflections was not caused.

Comparative Example 1

Figure 5:
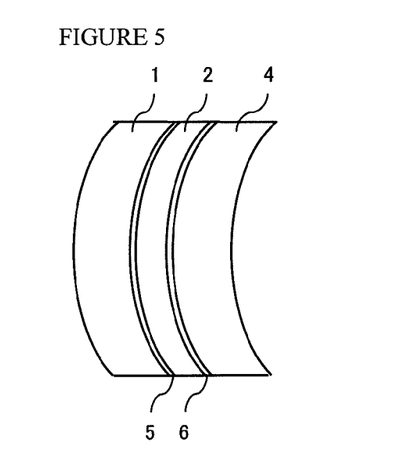
FIG. 5 is a schematic view of the section of the layer constitution of the polarized mirrored glasses lens in Comparative Example 1.

A curved polarized mirrored lens in FIG. 5 was prepared in a manner similar to that in Example 1, except that the absorption-polarization film layer was not provided in the layer constitution of the polarized mirrored sheet prepared in Example 1. In addition, the antireflection coating treatment was applied to the concave surface side of the curved polarized mirrored lens. The results of evaluation of the obtained curved polarized mirrored lens are shown in Table 1.

The visible light transmittance was 40%, and when the outer appearance of the lens was observed from the convex surface side of the lens, ghost image equivalent to that of the mirrored membrane generated by metal deposition was obtained. However, when the appearance of reflections on the concave surface side of the lens caused by reflection by DBEF was confirmed macroscopically, the appearance of reflections was so strong that it was difficult to use it as a lens for glasses.

TABLE 1

|  | Example 1 | Example 2 | Example 3 | Example 4 | Comparative Example 1 |
|---|---|---|---|---|---|
| Visible light transmittance (%) | 35 | 35 | 33 | 35 | 40 |
| Evaluation of ghost image | ○ | ○ | ○ | ○ | ○ |
| Evaluation of appearance of reflections | ○ | ○ | ○ | ○ | x |

EXPLANATIONS OF LETTERS OR NUMERALS 1, 4 transparent thermoplastic resin film (polycarbonate sheet)
2 reflection-polarization film layer
3 absorption-polarization film layer
5, 6, 7, 10 adhesive layer
8 injected resin layer
9 colored absorption-polarization film layer
11, 12 transparent thermoplastic resin film (triacetylcellulose film)

The invention claimed is:

1. A polarized mirrored glasses lens, which has, in order from a light incidence side, at least
   a colored absorption-polarization film layer (A);
   a reflection-polarization film layer (B); and
   an absorption-polarization film layer (C),
   wherein only an adhesive layer exists between said colored absorption-polarization film layer (A) and said reflection-polarization film layer (B),
   wherein only an adhesive layer exists between said reflection-polarization film layer (B) and said absorption-polarization film layer (C),
   wherein the transmission axes of said reflection-polarization film layer (B) and said absorption-polarization film layer (C) are aligned,
   wherein the light incidence side is a convex spherical or aspherical surface, and
   wherein the transmission axes of said colored absorption-polarization film layer (A) and reflection-polarization film layer (B) being aligned.

2. The polarized mirrored glasses lens according to claim 1, wherein a
   transparent thermoplastic resin film or
   sheet layer
   is laminated, via an adhesive layer, on
   the light emission side of the absorption-polarization film layer (C) or
   the light incidence side of the colored absorption-polarization film layer (A), or both.

3. The injected polarized mirrored glasses lens according to claim 1,
   wherein a transparent thermoplastic resin film or sheet layer is arranged on the light emission side of the absorption-polarization film layer (C), and wherein a layer made by injection-molding a transparent thermoplastic resin is integrated into the surface thereof of said transparent thermoplastic resin film or sheet layer.

4. The injected polarized mirrored glasses lens according to claim 2,
wherein the transparent thermoplastic resin film or sheet layer is arranged on the light emission side of the absorption-polarization film layer (C), and
wherein a layer made by injection-molding a transparent thermoplastic resin is integrated into the surface thereof of said transparent thermoplastic resin film or sheet layer.

* * * * *